Oct. 13, 1970   C. H. WOODHAM   3,533,601
METHODS AND APPARATUS FOR FORMING AMALGAMS
Filed May 13, 1968   6 Sheets-Sheet 2
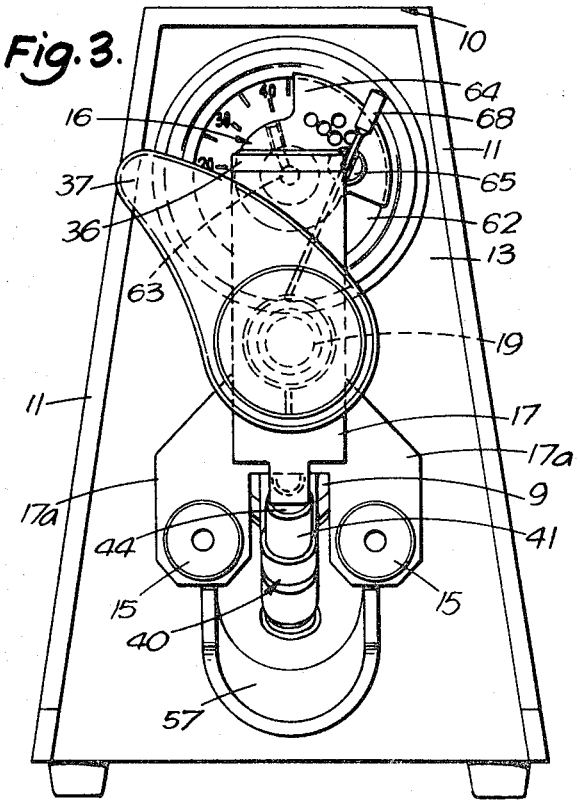
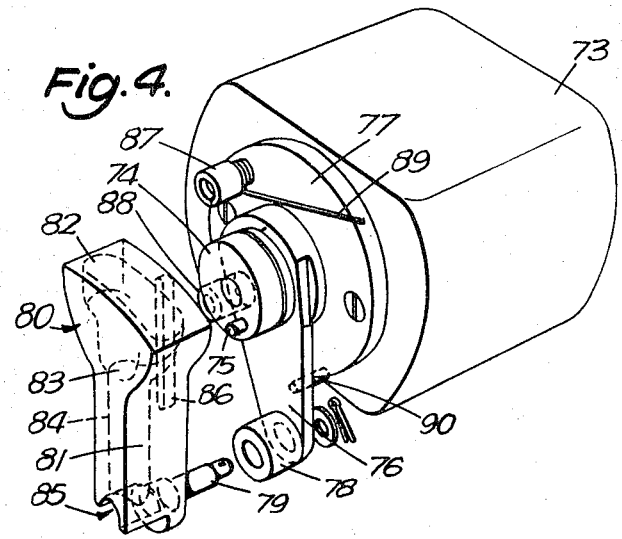
CECIL HALLIDAY WOODHAM,
INVENTOR

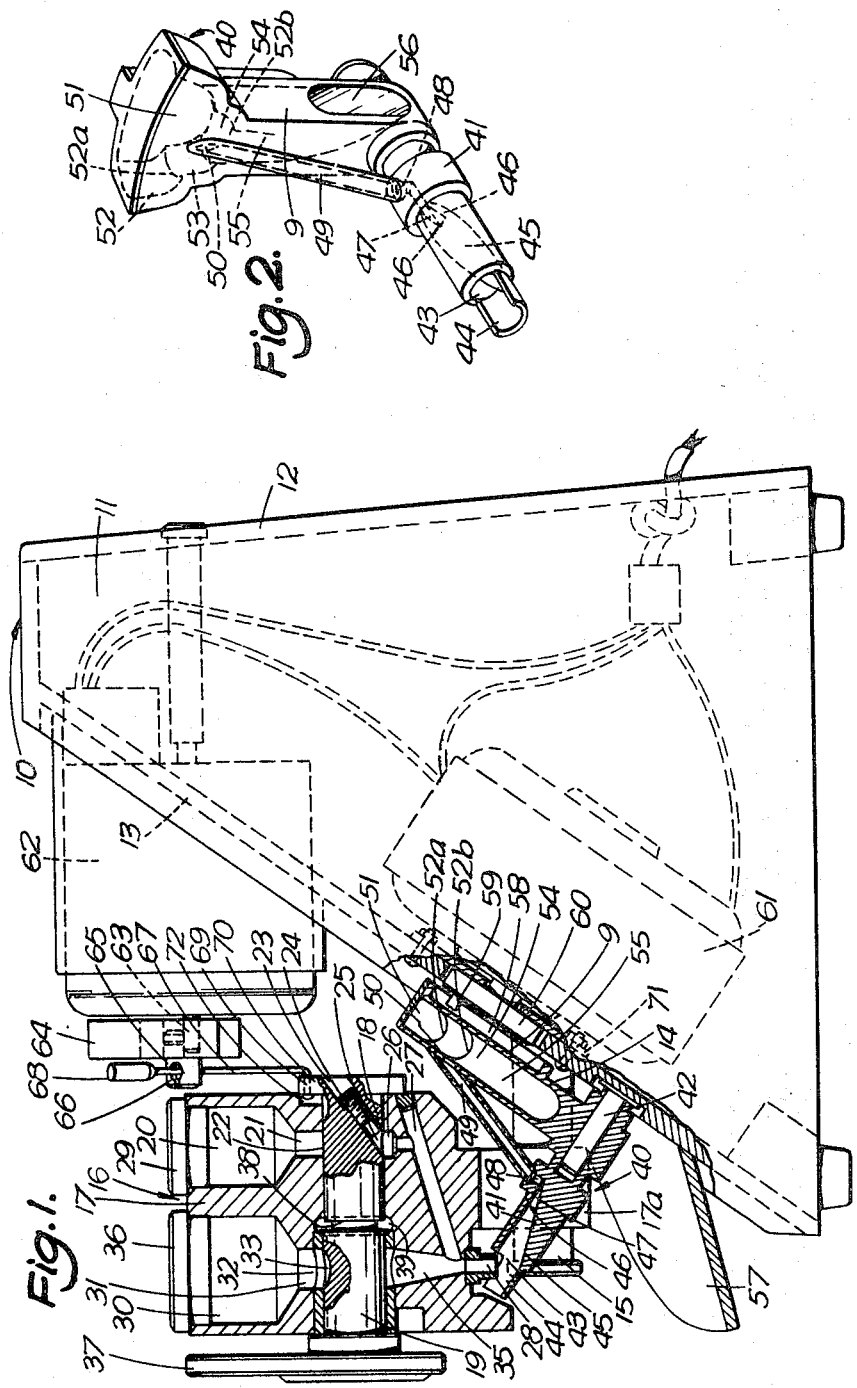

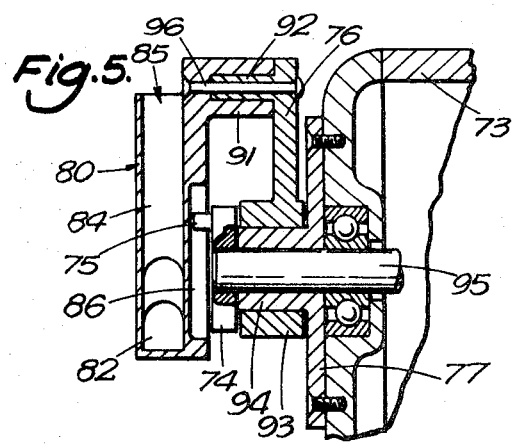
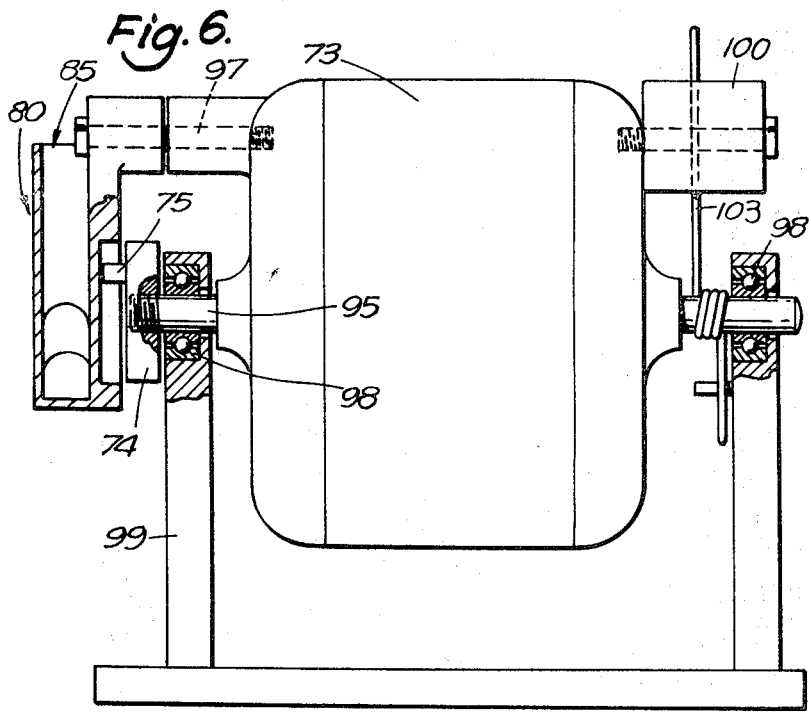

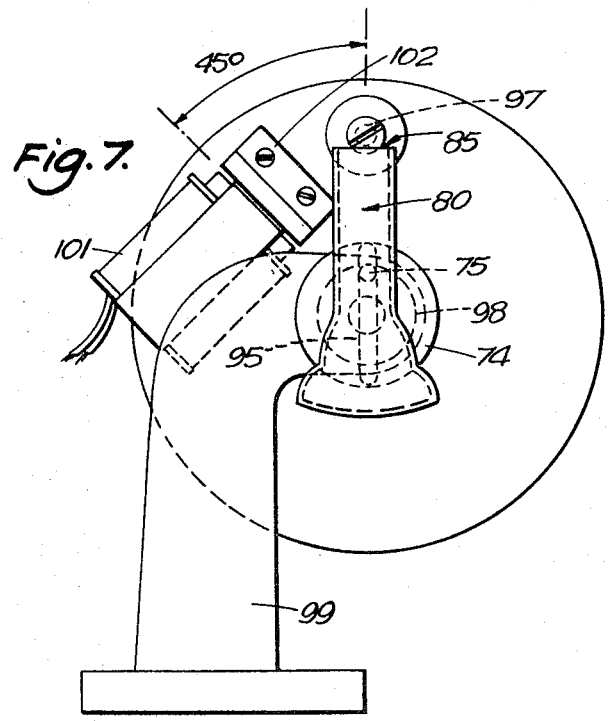
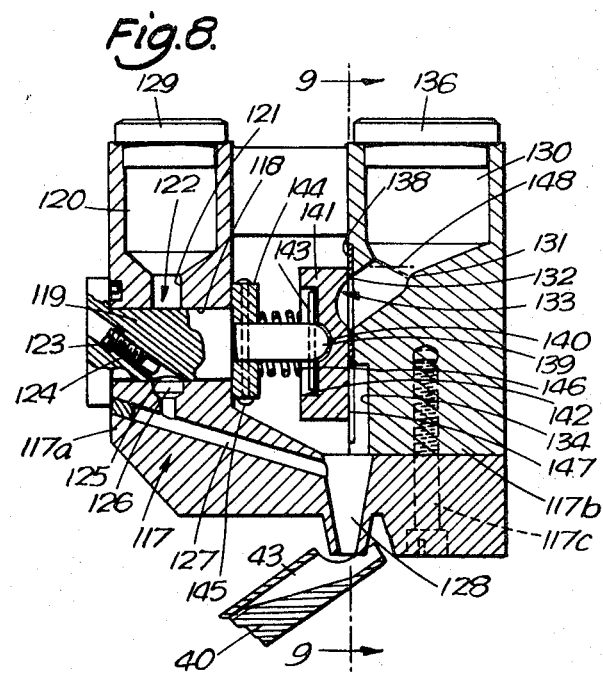

CECIL HALLIDAY WOODHAM,
INVENTOR

Oct. 13, 1970   C. H. WOODHAM   3,533,601
METHODS AND APPARATUS FOR FORMING AMALGAMS
Filed May 13, 1968   6 Sheets-Sheet 6

CECIL HALLIDAY WOODHAM,
INVENTOR
By Wenderoth, Lind & Ponack, Attys

United States Patent Office
3,533,601
Patented Oct. 13, 1970

3,533,601
METHODS AND APPARATUS FOR FORMING AMALGAMS
Cecil Halliday Woodham, Tuckaway Warren Drive, Kingswood, Surrey, England
Filed May 13, 1968, Ser. No. 728,429
Claims priority, application Great Britain, June 2, 1967, 25,662/67; Nov. 6, 1967, 50,445/67; Dec. 11, 1967, 56,247/67; Mar. 4, 1968, 10,417/68
Int. Cl. B01f 15/02
U.S. Cl. 259—2     13 Claims

ABSTRACT OF THE DISCLOSURE

The apparatus comprises a device which is oscillated by an electric motor about an inclined axis and comprises: a downwardly inclined feed passage into which metal alloy and then mercury are delivered in succession from a dispenser which measures out predetermined quantities of the materials; a feed tube leading up from the passage and arranged to transport the powder and mercury by centrifugal force as the device oscillates; a mixing chamber into which the feed tube delivers the powder and mercury; and a delivery conduit leading downwards from the mixing chamber and through which the mixed pellet of amalgam automatically falls after oscillation of the device ceases. Operation of the dispenser starts the motor and sets a timer which switches off the motor after a predetermined time.

---

The invention relates to methods and apparatus for forming amalgams and particularly for forming amalgams for use in dentistry. By an amalgam is meant the solution of a metal, in powdered form, in mercury.

In known methods of forming an amalgam, predetermined quantities of mercury and metal powder are introduced by hand into a chamber which is then agitated until the two materials form a homogeneous mass. The mercury is introduced into the chamber as a globule and the agitation gradually breaks up the globule into smaller globules which mingle with the powder. When the amalgation has been completed the pellet of amalgam is removed from the container by hand. The invention provides a variation of this method of forming an amalgam which may reduce the period and/or degree of agitation required and also provides an apparatus in which all or part of the process for forming the amalgam may be effected automatically to ensure that successive pellets of amalgam have similar characteristics.

During agitation of the chamber the materials become heated due to impact between the elements thereof and between the elements and the walls of the chamber, the degree of heating depending, inter alia, on the time of agitation. It will be appreciated that it will take a certain time for the amalgam to be completely formed by the above method, and it is found that during this time the degree of heating caused to the materials may adversely affect the characteristics of the finished amalgam. The method according to the invention, by enabling the period of agitation to be reduced, may also reduce the degree of heating of the materials during agitation to an extent whereby the finished amalgam has the required characteristics.

According to one aspect of the invention, therefore, a method of forming an amalgam of mercury and metal powder comprises introducing metal powder into a chamber, and then introducing mercury into the chamber in such a manner that the mercury is dispersed into a plurality of globules, the chamber being agitated whereby the dispersed globules of mercury combine with the metal powder to form an amalgam.

Preferably the agitation of the chamber begins before the mercury is introduced into it whereby the metal powder forms a cloud into which the mercury globules are dispersed.

The mercury may be dispersed into a plurality of globules by impinging the mercury against a surface within the chamber. For example the mercury may be discharged into the chamber through a single port disposed opposite said surface within the chamber. The surface may comprise the internal surface of a wall of the chamber.

As mentioned earlier the invention also provides an apparatus for forming an amalgam so arranged that all or part of the process for forming the amalgam is effected automatically so that successive pellets of amalgam have similar characteristics.

According to another aspect of the invention, therefore, apparatus for forming an amalgam of mercury and metal powder comprises a mixing chamber, means for agitating the mixing chamber, feed means adapted to introduce the materials into the mixing chamber, and delivery means adapted to deliver the amalgam from the mixing chamber when its formation has been completed.

Preferably the feed means are adapted to introduce the mercury into the mixing chamber in such a manner that the mercury is dispersed into a plurality of globules. For example, the feed means may be adapted to impinge the mercury against a surface within the mixing chamber.

The feed means comprise a feed conduit leading into the mixing chamber, and the feed conduit may be adapted, as the mixing chamber is agitated, to oscillate about an axis transverse to its length whereby the mercury and metal powder are urged along the conduit, towards the mixing chamber, by centrifugal force.

The feed conduit and mixing chamber may comprise parts of a single unitary oscillatable structure. The axis of oscillation of the unitary structure may be inclined to the horizontal, the mixing chamber being disposed above that axis, at least whilst being oscillated.

An entry for the mercury and metal powder into the feed conduit may be disposed at a point on its axis of oscillation, the feed conduit extending upwardly from that axis into the mixing chamber.

Preferably the amplitude of oscillation of at least a part of the feed conduit is greater than the internal dimension of that part in the direction of oscillation.

In any of the above arrangements the delivery means may comprise a conduit leading from an outlet in the mixing chamber, the chamber and conduit being so shaped and the outlet being so disposed that, whilst the chamber is being agitated, the materials are retained in the chamber, and, when agitation ceases, the compound is delivered by gravity from the mixing chamber through said conduit.

The outlet may be disposed in the lower part of the mixing chamber and the inner surface of the walls of the chamber adjacent the outlet to the conduit may be stepped, or otherwise shaped, to deflect transversely to the outlet material moving downwardly towards the outlet during agitation.

The delivery conduit and mixing chamber may also comprise parts of a single oscillatable structure.

Preferably also the amplitude of oscillation of at least a part of the delivery conduit is greater than the internal dimension of that part of the direction of oscillation.

Preferably the mixing chamber is oscillated along a curved path, the outlet to the delivery conduit being disposed on the inside of the curve whereby centrifugal force tends to urge material in the mixing chamber away from the outlet.

In any of the above arrangements in which the mixing chamber is oscillatable, the amplitude of oscillation of at least a part of the mixing chamber is preferably less than the internal dimension of that part of the mixing chamber in the direction of oscillation.

The means for agitating the mixing chamber may be controlled by a time switch which determines the period of agitation.

The apparatus may also comprise a dispenser adapted to supply to the aforesaid feed means predetermined quantities of mercury and metal powder to be formed into an amalgam. The dispenser is preferably mounted on the apparatus in a readily removable manner.

The dispenser may comprise a body part having a supply conduit leading from a reservoir for the metal powder to a first aperture in a face on the body part, and a delivery conduit leading from a second aperture in the face to a delivery outlet, and an element rotatably mounted on the body part and having a face which is in close, relatively rotatable engagement with the aforementioned face on the body part, the face on the element being formed with a depression which, in one rotational position of the element, is in register with the first aperture to receive a charge of powder from the reservoir, and in another rotational position of the element is in register with the second aperture to deliver the charge of powder through the outlet.

The rotatable element may comprise a circular cross-section shaft closely rotatable within a bore in the body part. Alternatively said engaging faces may extend outwardly with respect to the axis of rotation of the rotatable element, and may be relatively movable towards and away from one another, resiliently yieldable means being adapted to urge the two faces into engagement.

The two faces may each be flat and extend at right angles to the axis of rotation of the rotatable element, or they may be conical or frusto-conical.

In all of the above arrangements the dispenser is preferably arranged also to dispense a predetermined quantity of mercury and for this purpose the dispenser may comprise a shaft which is rotatable with the element and which is a close rotatable fit in a bore in the body part, a supply conduit leading to the bore from a reservoir for mercury, which conduit and reservoir are so arranged that the mercury is delivered under gravity to the bore, and a depression in the shaft which, in one rotational position of the shaft, is in register with the supply conduit so as to receive a charge of mercury, and in another rotational position of the shaft is in register with an outlet from the bore so as to deliver the charge of mercury through the outlet.

Said outlet from the bore for the mercury and the aforementioned delivery outlet for the metal powder may be in communication and may lead to a single final outlet from the dispenser.

Preferably the depressions, apertures, and outlets are so disposed that when the depression in the rotatable element is delivering a charge of metal powder through the delivery outlet, the depression in the rotatable shaft is receiving a charge of mercury, and vice versa.

The following is a more detailed description of various embodiments of the invention reference being made to the accompanying drawings, in which:

FIG. 1 is a part vertical section, part side elevation of an apparatus for forming an amalgam pellet from mercury and metal powder;

FIG. 2 is a perspective view of that part of the apparatus which comprises the feed means, mixing chamber, and delivery means;

FIG. 3 is a front elevation of the apparatus of FIG. 1;

FIG. 4 is an exploded perspective view of part of an alternative form of apparatus;

FIG. 5 is a vertical section through a slightly modified version of the apparatus shown in FIG. 4;

FIG. 6 is a vertical section through an alternative form of apparatus;

FIG. 7 is a front elevation of the apparatus shown in FIG. 6;

FIG. 8 is a vertical section through an alternative form of dispenser for dispensing metal alloy powder and mercury in predetermined quantities;

Figure 9:
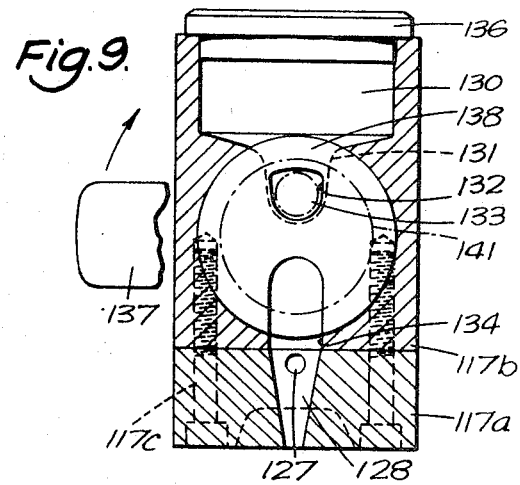
FIG. 9 is a section on the line 9—9 of FIG. 8.

Referring to FIGS. 1 and 2: there is provided a casing 10 having side walls 11, a back wall 12 and a sloping front wall 13.

Two spaced posts 14 project horizontally from the inclined front wall 13 and mounted on the posts 14 by means of knurled clamping nuts 15, so as to be readily removable, is a dispenser, indicated generally at 16, for mercury and metal powder.

The dispenser comprises a block 17, which may be formed from Perspex (Registered Trade Mark). The block is provided with downwardly extending lugs 17a by means of which it is mounted on the posts 14 and is formed with a circular cross-section horizontal bore 18 within which a shaft 19 is a close rotating fit.

Here is formed in the block 17 a first chamber 20 which constitutes a reservoir for mercury. The lower end of the chamber 20 communicates via a vertical bore 21 with an inlet port 22 into the bore 18. The shaft 19 is formed with a threaded hole 23 which extends diagonally from one end thereof to a location opposite an outlet port 26 from the bore 18. A grub screw 24 is disposed within the threaded hole 23 and the space 25 between the end of the grub screw and the outer surface of the shaft 19 constitutes the aforementioned depression which is adapted to receive a charge of mercury. It will be seen that the quantity of mercury may be adjusted by adjusting the grub screw 24.

The outlet port 26, which is diametrically opposite the inlet port 22, leads to an inclined bore 27 in the block 17 the lower end of the bore 27 communicating with a final outlet 28. The reservoir 20 is closed by a cap 29 which may be provided with an air hole (not shown). The cap 29 may be a push fit, as shown, or may be screw threaded.

The block 17 is provided with a second chamber 30 which constitutes a reservoir for the metal powder. The lower end of the chamber 30 communicates via a vertical bore 31 with an inlet port 32 into the bore 18. The shaft 19 is provided with a depression 33 which in the rotational position of the shaft shown in FIG. 1 is in register with the inlet port 32 from the reservoir. When the shaft 19 is rotated through 180° from the position shown in the drawing, the depression 33 is brought into register with an outlet port 34 which is diametrically opposite to the inlet port 32 and which leads via a downwardly tapered vertical bore 35 to the final outlet 28. The reservoir 30 is closed by a cap 36 which, like the cap 29, may be formed with an air hole, and may be a push fit, or screw threaded, in the upper end of the reservoir.

An operating lever 37 is mounted on the shaft 19 at one end thereof. It will be seen that when the depression 33 is in register with the port 32 the depression 33 will contain a predetermined quantity of metal powder from the reservoir 30. When the shaft 19 is rotated through 180° from the position shown in FIG. 1 the charge of powder will be carried around with the shaft 19 and will be discharged through the outlet port 34 and final outlet port 28. When the depression 33 is brought to this position the depression 25 is brought into register with the inlet port 22 and receives a charge of a predetermined quantity of mercury. When the shaft 19 is rotated back again through 180° to bring the depression 33 back into register with the port 32 to receive a fresh charge of metal powder, the depression 25 is brought into register with the outlet port 26 so that the charge of mercury which it contains is deposited through the port 26 and passes down along the bore 27 to be delivered through the outlet 28.

The shaft 19 is provided, between the two depressions 25 and 33, with a peripheral groove 38 which is disposed opposite a slot 39 in the block 17 so that mercury or metal powder leaking along the bore 18 falls out of the dispenser through the slot 39. Material from one part of the bore cannot therefore amalgamate with material from the other part of the bore and thus foul the shaft 19.

The clearance between the shaft 19 and the bore 18 is greater in the part of the bore into which the port 34 leads than it is in the part of the bore into which the port 22 leads. This is to reduce the likelihood of metal particles in the former part of the bore causing the shaft to jam.

Upon leaving the outlet 28 from the dispenser the metal powder and mercury fall into a device, indicated generally at 40 and shown in perspective in FIG. 2, which constitutes the aforementioned feed means, mixing chamber, and delivery means. The device 40 may be moulded from plastics material or may be built up from separate components cemented together. The device 40 comprises a main shaft 41 which is freely rotatable on a steel stub shaft 42 which projects at right angles from the front wall 13 of the casing 10.

As best seen from FIG. 1, the block 17 is formed at its front, lower end with a projection which overlies the upper, cut away, end of the shaft 41 so that when the dispenser is in position on the apparatus the projection forms a stop which prevents the shaft 41 being displaced upwardly on the stub shaft 42 on which it is pivotable.

The end of the shaft 41 remote from the wall 13 is fromed with a bore 43 which is cut away at 44 so that material falling through the outlet 28 passes into the end of the bore 43. As the bore extends along the shaft 41 towards the casing its bottom wall merges into a flat feed plane 45. The feed plane 45 extends diagonally across the bore 43 but, as will be seen from FIG. 1, it is inclined downwardly away from the outlet 28 due to the inclination of the shaft 41. At its lower end two side edge portions of the feed plane 45 curve upwardly at 46 to close off the bore 43 leaving a narrower central channel 47 between the side portions along which channel material in the bore 43 passes. The lower end of the channel 47 communicates with a port 48 at the lower end of an inclined feed tube 49. The upper end of the feed tube 49 leads to a port 50 which opens into a mixing chamber 51 mounted at the upper end of a pillar 9 extending radially outwards from the shaft 41. The mixing chamber 51 has a flat front and rear faces and a curved upper wall which is concentric with the axis of the shaft 41. Each of the two side walls of the mixing chamber 51 comprises two curved portions 52 and 53 leading down to an outlet 54 from the mixing chamber and forming a step 52a between them. A step 52b is also formed between the lower curved portion 53 and the outlet 54 as best seen in FIG. 1. The outlet 54 is at the upper end of a circular cross-section passage 55 which extends downwardly through the pillar 9 towards the shaft 41 and, as best seen in FIG. 2, curves laterally at its lower end to an outlet 56 in the side of the pillar 9. Disposed below the outlet 56 is a delivery chute 57 mounted on the inclined front wall 13 of the casing.

The side of the pillar 9 which faces the wall 13 of the casing is formed with two upwardly extending parallel walls defining a slot 58. The slot 58 is engaged by a crank pin 59 eccentrically mounted on a wheel 60 which is driven by an electric motor 61 mounted within the casing 10. A felt washer 71 encircles the shaft of the motor 61 and is secured to the inside of the front wall 13 of the casing to prevent the possibility of split mercury leaking into the casing. The electric motor 61 is controlled by a time switch 62 which is also mounted within the casing 10. The operating shaft 63 of the time switch has mounted on it an operating lever 64 which carries a crank pin 65. The crank pin 65 is formed with a transverse hole 66 through which passes a connecting rod 67. One end of the connecting rod 67 is formed with a head 68 and the opposite end is eccentrically connected at 69 to a disc 70 mounted or integrally formed on the end of the shaft 19 of the dispenser. A pin (not shown) projects from the inner face of the disc 70 and is reecived within an arcuate recess 72 in the end face of the block 17. The ends of the recess act as stops which are engaged by the pin to limit the rotation of the shaft 19 to 180°.

The operation of the apparatus is as follows: Initially the recess 33 in the shaft 19 of the dispenser is in register with the part 32 (as shown in FIG. 1) and contains a charge of metal powder. The lever 37 is then rotated through 180° so that the measured charge of metal powder is delivered through the outlet 28 into the end of the bore 43 as described above. Rotating the shaft 19 through 180° causes the connecting rod 67 to pull downwardly on the control lever 64 of the time switch 62. This sets the time switch and switches on the electric motor 61 causing the wheel 60 to rotate so that the device 40 is oscillated about the bearing pin 42. The arrangement is preferably such that the electric motor is switched on just before the powder is dispensed, so that the feed plane 45 is oscillating by the time the powder reaches it. However, this is not essential and a satisfactory amalgam will still be obtained if the motor is switched on, and the device 40 begins to oscillate, a short period (perhaps a fraction of a second) after the powder has dropped from the outlet 28 and on to the feed plane 45. The powder delivered into the bore 43 moves, under gravity initially, down the oscillating flat feed plane 45 in the bore 43 and through the channel 47 to the lower end of the feed tube 49. At the lower end of the feed tube the powder has moved a short distance away from the axis of oscillation of the device 40 and centrifugal force urges the powder away from the axis of oscillation and upwardly along the tube 49 and into the mixing chamber 51. Once in the mixing chamber 51 the powder is agitated as the mixing chamber oscillates and forms a cloud in the mixing chamber. In the meantime the lever 37 has been rotated back through 180° to the initial position and this, as described above, deposits a predetermined quantity of mercury into the end of the bore 43.

The return of the shaft 19 to its initial position also moves the head 68 on the connecting rod 67 away from the pin 65 so that the lever arm 64 on the time switch is free to rotate upwardly under the action of the time switch mechanism.

The measured quantity of mercury dispensed from the dispenser 16 falls under gravity down the feed plane 45 to the lower end of the feed tube 49. The globule of mercury is urged upwardly along the feed tube 49 by centrifugal force, the mercury remaining in the form of a globule filling the tube. The globule passes upwardly along the feed tube and is discharged into the mixing chamber 51 through the port 50. The globule of mercury impinges on the upper acruate wall of the mixing chamber 51 and explodes into many small globules within the cloud of powder in the mixing chamber. There is thus very great initial intimacy of the alloy particles and mercury globules. Once in the mixing chamber 51 the mercury globules and powder are agitated from side to side of the mixing chamber as it oscillates and are thoroughly mixed together to form an amalgam. The effect of centrifugal force on the pellet of material in the mixing chamber tends to urge it upwardly away from the outlet 54 from the mixing chamber and the curved stepped walls 52 and 53 of the mixing chamber tend to impart transverse movement to material in the mixing chamber should it try to fall downwardly, through the outlet 54. When the time has elapsed for which the time switch 62 was set and the lever 64 reaches its uppermost position the electric motor is switched off by the time switch and the pellet of amalgam which has been formed in the mixing chamber 51 falls through the outlet 54, down the passage 55 and out through the outlet 56 into the delivery chute 57 from which it falls into a suitable receptacle placed below the chute.

It is important that the metal powder should be dispensed before the mercury. The mercury is thus fed into the cloud of metal powder in the mixing chamber 51 and the elasticity of the mercury globules is rapidly dissipated by their sudden intimate contact with the metal particles. This prevents the mercury "exploding" out of the open end of the bore 55. Also the mercury tends to clean the tube of any particles of powder adhering to its walls. It is not, however, absolutely essential for all the metal powder to have reached the mixing chamber 51 before the mercury is dispensed. If the mercury arrives on the feed plane 45 before all the metal powder has passed up the feed tube 49 and into the mixing chamber, then the mercury globule will be held back by the powder and will only enter the feed tube 49 when the powder has passed up it. This may reduce the velocity of the mercury globule along the feed tube so that the globule does not impinge on the upper wall of the mixing chamber with the full exploding effect. Nevertheless a mixed pellet of amalgam will still be obtained.

It will be appreciated that the speed of oscillation of the device 40 must be such as to ensure adequate velocity of the globule up the feed tube 49 so that the globule impinges with sufficient force on the arcuate upper wall of the mixing chamber.

It will be appreciated that the port 26, passage 27, outlet 28, and the feed tube 49 should all be of sufficient internal diameter to allow the mercury globule to be maintained in a single compact mass as it passes from the dispenser to the mixing chamber, so that the globule of mercury is discharged into the mixing chamber 51 in a single mass so that there is produced a single explosion of the whole mass almost immediately. If the passages are of too small an internal diameter the mercury will arrive at its destination in an attenuated stream and will not explode in the required manner against the upper wall of the mixing chamber so as to be dispersed amongst the cloud of metal powder. It will also be appreciated, however, that the diameter of the feed tube cannot be so wide as to upset a desirable feed rate for both mercury and alloy powder.

The pin 66 in the lever 64 on the time switch is preferably adjustable to various positions on the lever so that the time of oscillation of the device 40 may be varied, for example according to the type of metal powder used in the amalgam.

It will be seen that the dispenser 16 provides accurately predetermined proportions of metal powder and mercury to form the amalgam. Larger pellets of amalgam can be formed by operating the dispenser 16 two or more times to deliver multiple charges of metal powder and mercury to the device 40. However it must be ensured that no more material is dispensed than can be mixed in the mixing chamber 51 and delivered through the conduit 55. Preferably the dimensions and shape of the mixing chamber 51 are such that it is not possible to mix in the chamber a pellet which cannot fall through the passage 55, owing to the size and/or shape of the pellet. As mentioned below, the shape of the curved stepped walls 52 and 53 of the mixing chamber is preferably such as to produce a rounded ball of amalgam for easy discharge.

It is found that to ensure that centrifugal force retains the material in the chamber, the amplitude of angular oscillation of the device 40 is preferably such that at least a part of the passage 55 oscillates through an arc which is greater than the width of that part of the passage or chamber in the direction of oscillation.

On the other hand it is found that, to ensure efficient and fast amalgamation of the mercury and metal powder in the mixing chamber, it is desirable that at least a part of the mixing chamber should oscillate through an arc which is less than the internal width of that part of the mixing chamber. Both these requirements are achieved by the device shown in which the internal width of the mixing chamber is greater than that of the delivery conduit 55. Also to ensure efficient feeding of the mercury and metal powder along the feed tube 49 by centrifugal force it is desirable, as mentioned earlier, that the amplitude of oscillation of at least a part of the feed tube 49 should be greater than the internal dimension of that part in the direction of oscillation.

It will be appreciated that many modifications may be made to the above arrangement without departing from the scope of the invention. The dispenser 16 can be replaced by any other convenient known form of dispenser for supplying measured quantities of mercury and metal powder, or any of the forms of dispenser to be described below. The dispenser need not form an integral part of the apparatus, but the required quantities of material may be measured out by a separate dispenser or in any other convenient manner and introduced into the end of the bore 43, for example through a funnel. The time switch may be set by hand instead of by operation of the dispenser, or may be omitted entirely, the operation of the electric motor then being controlled by manual switches.

Instead of the feed tube 49 being formed on a unitary structure with the mixing chamber the tube may be flexible extending from a fixed funnel to the mixing chamber and being so disposed that the tube oscillates to and fro with the mixing chamber so that centrifugal force still transports the material along the tube to the chamber.

As shown in FIG. 1 the depression 25, in the shaft 19, which receives a charge of mercury is adjustable in volume by means of a grub screw 24. It will be appreciated that, if required, the volume of this depression need not be adjustable and the mercury may be delivered into a fixed cavity in the shaft 19. In an alternative arrangement (not shown) the grub screw 24, instead of being inclined as shown in FIG. 1, may extend radially into the shaft 19 through the bottom of the cavity which receives the mercury, the head of the grub screw constituting the bottom wall of the cavity. In this case it will be appreciated that the grub screw will require to be adjusted by passing a screwdriver through the dispenser 20 to engage the slotted head of the grub screw.

Due to the high surface tension of mercury there is a tendency for the mercury not to fill the cavity in the shaft 19 completely. To ensure that it does fill the cavity completely it is essential that there should be an adequate head of mercury in the reservoir 20 so that the mercury in the cavity is under pressure. To provide an adequate head the vertical bore 21 may be somewhat longer than is shown in FIG. 1 and preferably there is marked on the reservoir 20 an indication of the minimum level of mercury necessary to provide an adequate head, and it should be ensured that the level of mercury does not fall below this point. Conveniently the vertical bore 21 may be made of such a height that the upper end of the bore constitutes the lowest permissible level of the mercury.

Also to ensure that the mercury completely fills the cavity in the shaft 19 the cavity is preferably cup-shaped and of rounded contour. Thus in the case where an adjusting grub screw is provided, the part of the grub screw which forms part of the wall of the cavity is preferably cup-shaped. By thus avoiding sharp angles in the cavity the pressure of mercury necessary to ensure that the cavity is completely filled is less.

As shown in FIG. 1 the thread of the grub screw does not extend along the full length of the screw so that at no time, whatever the adjustment of the screw, does the threaded part of the bore in the shaft 19 form a part of the cavity.

Although the cavity 33, for receiving the alloy powder, may be of any convenient shape it is preferably concave and smoothly curved as shown in FIG. 1 to ensure that all the alloy powder can easily fall out of the cavity when it is inverted.

In a modified form (not shown) of the device 40 shown in FIGURE 2, there are provided separate feed tubes 49 for delivering the mercury and alloy powder into the mixing chamber. There is provided, beyond the part 44 of FIG. 2, a second bore feed plane and feed tube assembly corresponding to the parts 43, 44, 45, 46, 47, 48 and 49, the second bore being co-axial with the bore 43. The second feed tube is inclined upwardly above the feed pipe 49 and leads to a port in the mixing chamber above the port 50.

Alternative feed means may be provided to feed the material into the mixing chamber. For example, in the case where the device incorporating the mixing chamber is pivotally mounted the device may be so arranged that it is initially inverted with the port 56 uppermost so that material can be introduced into the chamber through the port 56 and passage 55, or another feed tube leading to the mixing chamber. In this case a transmission may be provided which swings the mixing chamber upwardly to a position corresponding to that shown in FIGS. 1 and 2 at the start of the agitation of the chamber. When agitation finishes the device will return to its initial position in which the port 56 is uppermost. Delivery of the finished pellet of amalgam from the chamber may be effected by momentarily inverting the device by hand. Alternatively there may be a momentary delay, during which the pellet falls out of the chamber, between the agitation ceasing and the device returning to its initial position.

Alternatively the mixing chamber may be agitated and the mixing effected whilst the chamber is still in the inverted position in which case the material is maintained in the chamber partly by gravity. The device is then swung through 180° after mixing has been completed to discharge the pellet of amalgam. Such an arrangement is shown in FIG. 4.

In this arrangement there is provided an electric motor 73 the shaft of which carries a disc 74 having a crank pin 75. An arm 76 is freely rotatable around the motor shaft, for example it is rotatable on a fixed bearing concentric with the shaft. The arm 76 is disposed between the disc 74 and a circular plate 77 secured to the motor casing. At its free end the arm 76 is provided with a hollow boss 78. The hollow boss acts as a bearing for a spindle 79 which projects from a mixing device 80 which is somewhat similar to the device 40 of FIG. 2. The device 80 comprises a pillar 81 at the upper end of which is formed a mixing chamber 82 which is somewhat similar in shape to the mixing chamber 51. An outlet 83 from the mixing chamber leads to a circular cross-section passage 84 extending downwardly, through the pillar 81 to an outlet 85. The side of the pillar 81 and chamber 82 which faces the disc 74 is formed with a slot 86 which receives the crank pin 75. Mounted on the plate 77 are upper and lower stops 87 and 88, the upper stop having secured to it a helical spring having a free projecting end 89.

A dispensing device and time switch (not shown) may be associated with the apparatus and may be similar to those in arrangements of FIGS. 1 to 3.

FIG. 5 is a vertical section through a form of apparatus which is almost identical to that shown in FIGURE 4 but differs in that the mixing device 80 is provided with a hollow boss 91 which is pivotable on a pin 92 secured to the arm 76, rather than vice versa as shown in FIG. 4. The arm 76 projects radially outwards from a central boss 93 which is rotatable around a bearing tube 94 which projects forwardly from the plate 77 and encircles the shaft 95 of the motor. As best seen in FIG. 4 the end of the passage 84 which is lowermost in FIG. 4 is cut away. The passage is similarly cut away in the arrangement of FIG. 5 and this allows a fixing pin 96 to be inserted to locate the boss 91 on the pin 92.

In operation of the apparatus shown in FIGS. 4 and 5 the device 80 is initially in the attitude shown in FIG. 4. When the motor is switched on the disc 74 rotates anti-clockwise causing the device 80 to oscillate about the spindle 79 in the arrangement of FIG. 4, or the spindle 92 in the arrangement of FIG. 5. The driving engagement between the rotating crank pin 75 and the slot 86 in the device 80 applies a torque to the device 80 causing the device and the arm 76 to be swung anti-clockwise until it engages the upper stop 87 and a peg 90 (see FIG. 4) on the arm 76 engages the free end of the spring 89. The device 80 is then in the position shown in FIG. 5 with the port 85 disposed below the outlet from the dispenser. The measured quantities of mercury and metal powder are then delivered from the dispenser and fall down the passage 84 and into the oscillating mixing chamber 82 where they are mixed together to form an amalgam. When this mixing is completed the motor is switched off, either manually or by the time switch as described in the earlier arrangement. The arm 76 is then urged away from the stop 87 by the spring 89 and falls under gravity to its original position shown in FIG. 4. The pellet of amalgam falls out of the mixing chamber through the passage 84 and outlet 85 into a suitable receptacle. In a modified version (not shown) of the arrangement shown in FIGURES 4 and 5 the boss 93 is rotatable directly on the motor shaft 95 instead of on a tubular bearing 94 which is concentric with the motor shaft.

FIG. 6 shows a modified version of the arrangement shown in FIGS. 4 and 5. In the arrangement of FIG. 6 the device 80 is rotatable on a pin 97 which is mounted on the casing of the motor 73. The shaft 95 of the motor is rotatable in bearings 98 on a fixed base 99. A counter weight 100 is also mounted on the casing of the motor. In the case where the motor is not provided with a casing the pin 97 may be mounted on a suitable bracket secured to the motor assembly. In an alternative arrangement (not shown) the motor may be rotatably supported by means of tubular bearing sleeves, fixed on the motor casing, which surround the shaft 95 and are supported in bearings on the base 99.

In operation of the apparatus shown in FIG. 6 the weight 100 maintains the motor in a rest position inverted from that shown in FIG. 6 with the port 85 in the device 80 lowermost. When the motor is switched on to rotate the shaft 95 clockwise as seen in FIG. 7, the starting torque swings the motor casing anti-clockwise bringing the casing and hence the device 80 and weight 100 to the position shown in FIG. 6. Material is then delivered into the device 80 from the dispenser as before and an electro magnet 101 (controlled by the time switch which automatically controls the device) is energised and holds a bracket 102 on the motor casing so as to maintain the motor in the position shown in FIGS. 6 and 7. The face of the bracket 102 which engages the electro magnet is inclined at about 45° to the vertical as seen in FIG. 7. When mixing of the amalgam has been completed, the motor is automatically switched off and the electro magnet 101 is deenergised by the time switch, and the weight 100 swings downwardly to return the motor to its original position. Preferably the weight 100 is so disposed that it is offset from the dead centre position when in the upper position shown in FIG. 6 so that the motor cannot get stuck in the position shown in FIGS. 6 and 7. Alternatively the weight 100 (or a stop on the motor casing) may engage a spring indicated at 103, when in its uppermost position so that the spring pushes the weight away from the dead centre position when the electro magnet is de-energised.

It is desirable, as mentioned earlier, that the globule of mercury should be maintained in a single compact mass as it is introduced into the mixing chamber so that the globule impinges against the wall of the mixing chamber and is dispersed into a plurality of globules. For this purpose, therefore, the arrangements last mentioned above with reference to FIGS. 4, 5, 6 and 7 are preferably modified by providing a separate feed tube which extends along side the discharge passage but is narrower in cross-section than the discharge passage, so that the mercury globule is not broken up as it passes along the feed tube, but is discharged into the mixing chamber in a single compact mass.

Although as described above in relation to the arrangement shown in FIGS. 4, 5, 6 and 7 the dispenser may be arranged to drop the material into the open upper end of the mixing device, so that it impinges on the bottom wall of the mixing chamber under gravity, it will be appreciated that other means may be arranged to deliver the materials into the mixing chamber in those arrangements. For example the mixing device 80 may be provided with a feed tube operating in a somewhat similar manner to the feed tube 49 of the arrangements of FIGS. 1 to 3. Such a feed tube may be of less diameter than the main passage 84 in the device. Alternatively flexible tubes may feed the mixing chamber the flexible tube being so arranged that the material is fed along it by centrifugal force. Alternatively the material may be fed along the flexible tube by gravity.

In cases where a dispenser and time switch are incorporated in the apparatus any convenient form of linkage may be connected between them for example, cams, gears, sprockets and chains, belts and pulleys etc. The linkage can be such that the shaft 19 can be continually rotated step-by-step in one direction. In the case described above in which the shaft is rotated back and forth through 180° a return spring may be provided on the shaft to return the shaft to its initial position.

The time switch may be of any convenient known form for example of the known clockwork or electrically operated type.

The rounded shape of the steps 52 and 53 shown in FIGS. 1 and 2 ensures that the pellet of amalgam formed is as near spherical as possible, and in the arrangement of FIG. 4, the corresponding steps are cup-shaped so as further to ensure this. Other, angular, forms of step may be employed if required. The junction between the upper curved portion 52 and the arcuate top wall of the mixing chamber may be curved. A greater number of steps than the two shown in FIGS. 2 and 4 may be employed, the requirement being that the steps should impart movement to the particles from side to side across the mixing chamber to assist in keeping the particles in the chamber, and yet should not interfere with the free discharge of the pellet from the chamber when the chamber comes to rest.

In any of the forms of apparatus described above, any other convenient method may be employed to agitate the mixing chamber. For example a solenoid arrangement may be employed.

In the various forms of apparatus described the operation of the motor and oscillation of the device 40 results in a degree of vibration of the apparatus and it is important that this vibration should not be damped but should be permitted to be transmitted to the dispenser 16. This ensures that the recesses 33 and 25 in the shaft 19 of the dispenser are completely filled with metal powder and mercury respectively the vibration shaking the materials down into the recesses. The vibration also ensures very rapid and complete fall away of the materials from the recesses and from the various delivery passages in the dispenser. This ensures that in successive pellets of amalgam formed by the apparatus the quantities of mercury and alloy powder embodied in the pellets are substantially constant so that the pellets of amalgam are of consistent quality.

In a modification of the apparatus described the mixing device 40 includes a mixing chamber which is detachable from the rest of the apparatus. Thus a closed mixing chamber may be supplied which is already filled with a predetermined quantity of metal powder. The chamber may be opened and applied to a conduit on the apparatus along which the mercury is to be delivered, or the closed chamber may be so arranged that its closure is automatically broken when the chamber is applied to the conduit. It is then only necessary for the dispenser to dispense a predetermined quantity of mercury depending on the quantity of powder already contained in the mixing chamber.

In further modified forms of the apparatus, not shown, other means may be provided for forcibly discharging the mercury into the mixing chamber. The mercury may, for example, be discharged by a fluid energised plunger or a spring energised device.

As mentioned earlier various forms of dispensers for metal powder and mercury may be used with the forms of apparatus described above.

One such known form of dispenser comprises a rectangular cross-section bar which is reciprocable within a correspondingly shaped bore and is provided with two vertical cross bores which in one position of the bar are disposed beneath reservoirs for alloy and mercury respectively, and in a second position of the bar are disposed above separate outlet ports which lead to a common delivery port. Thus in one movement of the bar measured quantities of both mercury and alloy are delivered simultaneously from the common delivery port. As mentioned above it is an important feature of the dispenser 16 shown in FIG. 1 that the metal powder is dispensed before the mercury is dispensed. The above known form of dispenser may therefore be modified to be more suitable for use with the present apparatus to give this effect. Thus the two vertical bores in the rectangular cross-section bar are so disposed that when one bore is in register with its reservoir the other bore is in register with its outlet. (There may be provided only a single common outlet if required.) Thus in one position of the bar one bore is receiving a charge of mercury while the other bore is dispensing a charge of alloy powder through the outlet. As the bar is reciprocated the charge of mercury is brought opposite the outlet and is dispensed through it while the other, empty bore is brought opposite the reservoir of alloy powder to receive a further charge ready for the next operation.

Where a rotary dispenser of the kind shown in FIG. 1 is used, disadvantages may occur when the metal powder is extremely fine. There may be a tendency for particles of such fine powder to find their way between the interengaging faces of the body part and the rotatable shaft of the dispenser and powder can, in time, build up between these faces and cause the shaft to bind. The various modified forms of rotary dispenser now to be described are designed to overcome this disadvantage.

The modified form of dispenser shown in FIGS. 8 and 9 comprises a block 117, which may be formed from Perspex (registered trademark). The block is formed in two parts 117a and 117b secured together by screws 117c. The part 117a may be formed with downwardly extending lugs (not shown) by means of which the dispenser may be mounted on any of the forms of amalgamating apparatus described above.

The part 117a of the block is formed with a circular cross-section horizontal bore 118 within which a shaft 119 is a close rotating fit. There is also formed in the part 117a of the block a first chamber 120 which constitutes a reservoir for mercury. The lower end of the chamber 120 communicates via a vertical passage 121 with an inlet port 122 into the bore 118. The shaft 119 is formed with a threaded hole 123 which extends diagonally from one end thereof to a location opposite an outlet port 126 from the bore 118. A grub screw 124 is disposed within the threaded hole 123 and the space 125 between the end of the grub screw and the outer surface of the shaft 119 constitutes the aforementioned depression which is adapted to receive a charge of mercury. It will be seen that the quantity of mercury may be adjusted by adjusting the grub screw 124.

The outlet port 126, which is diametrically opposite the inlet port 122, leads to an inclined bore 127 in the block part 117a and the lower end of the bore 127 communicates with a final outlet 128. The chamber 120 is closed by a cap 129 which may be provided with an air hole (not shown).

The part 117b of the block is provided with a second chamber 130 which constitutes a reservoir for the metal powder. The chamber 130 is closed by a cap 136 which, like the cap 129, may be formed with an air hole. The lower end of the chamber 130 communicates through an inclined passage 131 with a shaped aperture 132 in a circular metal plate 138 the surface of which is flush with the upright side face of the part 117b of the block.

The part of the shaft 119 which projects beyond the bore 118 is reduced in diameter and the end of the reduced portion of the shaft is rounded as indicated at 139 and is loosely received within a rounded depression 140 formed in a disc 141, which constitutes the aforementioned rotatable element. The face of the disc is formed with two slots 142 which extend radially from the axis of the shaft 119. A cross pin 143 extends through the shaft and its projecting ends are received within the slots 142 in such manner that the disc 141 can move axially and tilt on the end of the shaft. An annular abutment disc 145 is secured to the shaft 119, by a pin 144, adjacent the step at the end of the reduced diameter portion of the shaft. A helical compression spring 146 (having flat ends, in known manner) encircles the reduced portion of the shaft between the disc 145 and the disc 141 so as to urge the face 147 of the disc 141 closely into engagement with the face of the circular plate 138.

The face 147 of the disc 141 which is in close engagement with the plate 138 is formed with a part-spherical depression 133 which, in the rotational position of the shaft shown in FIG. 1, is in register with the inlet port 132 from the reservoir 130. When the shaft 119 is rotated through 180° from the position shown in FIG. 8, the depression 133 is brought into register with an outlet slot 134 formed in the upright face of the block part 117b and the plate 138. The outlet slot 134 is diametrically opposite to the inlet port 132 and leads downwardly to the final outlet 128.

An operating lever 137 (see FIG. 9) is secured to the shaft 119 at one end thereof. It will be seen that when the depression 133 is in register with the port 132 the depression will contain a predetermined quantity of metal powder from the reservoir 130. When the shaft 119 is rotated through 180° from the position shown in FIG. 8 the charge of powder will be carried around with the disc 141 and will be discharged through the outlet slot 134 and final outlet port 128. When the depression 133 is brought to this position the depression 125 will have been brought into register with the inlet port 122 and will receive a charge of a predetermined quantity of mercury. When the shaft 119 is rotated back again through 180° to bring the depression 133 back into register with the port 132 to receive a fresh charge of metal powder, the depression 125 will be brought into register with the outlet port 126, as shown in FIG. 1, so that the charge of mercury which it contains is deposited through the port 126 and passes down along the bore 127 to be delivered through the outlet 128.

When the dispenser is mounted on an amalgamating apparatus of the kind shown in FIG. 1, the outlet 128 is disposed above the cutaway end of the bore 43 of the device 40.

Since the disc 141 is resiliently pressed into engagement with the plate 138 by the spring 146, the two engaging surfaces of the disc and plate will be in close engagement and there will be little tendency for metal powder in the passage 131 and depression 133 to find its way between the disc and plate. However should powder, in time, accumulate between the two surfaces this will not cause the two surfaces to bind since the disc 141 can yield resiliently, tilting and/or moving axially, so that it can still freely rotate.

Figure 10:
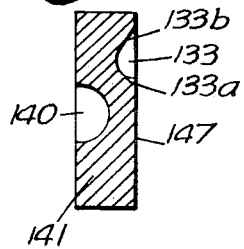
FIG. 10 is a section through an alternative form of rotatable element for use in the dispenser of FIGS. 8 and 9.

FIG. 10 shows a modified form of the disc 141 in which the depression 133, instead of being a simple part-spherical depression, is formed by a ball ended mill entering at an angle to the axis of the disc so as to form a depression of the shape shown. When the depression is shaped thus the part 133a of the depression meets the face 147 of the disc substantially at right angles instead of at an angle as in the case of the depression 133 shown in FIG. 8, and thus makes for better retention of the powder in the depression when it is in the position shown in FIG. 1 in register with the port 132. The straight portion 133b of the depression shown in FIG. 3 also allows rapid filling and complete fall away of powder from the depression when the depression is in register with the outlet slot 134.

Depending on the material from which the part 117b is formed, the plate 138 may, if desired, be dispensed with, the disc 141 engaging directly with the surface of the part 117b. It will be appreciated that the reservoirs 120 and 130 may be made larger to accommodate greater quantities of mercury and alloy powder respectively by extending them towards one another. They may also be extended towards one another in order to cut down the height or width of the reservoirs. It will be appreciated also that for proper operation of the dispenser the level of alloy powder in the reservoir 130 must be kept above the line indicated at 148 in FIG. 8 to ensure that the depression 133 is completely filled.

Figure 11:
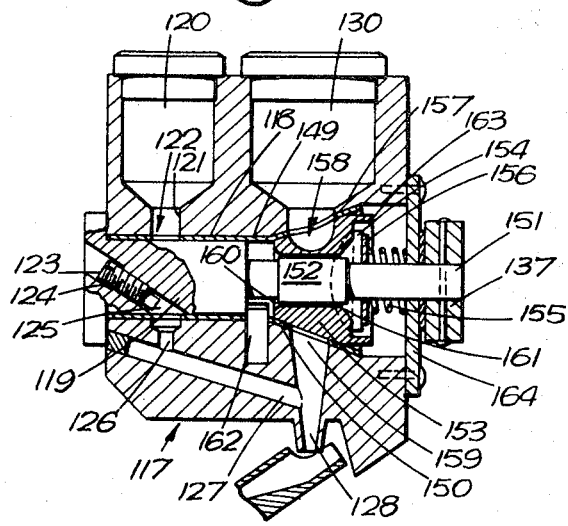
FIG. 11 is a similar view to FIG. 8 showing an alternative form of dispenser.

FIG. 11 shows a modified arrangement according to the invention and parts shown in this figure which correspond to parts in FIGS. 8 and 9 bear the same reference numerals.

In the arrangement of FIG. 11 the shaft 119 is received within a metal sleeve 149 which lines the bore 118. At its end the sleeve 149 has an outwardly tapering conical portion 150.

The shaft 119 is formed with an extension 151 of reduced diameter, which extension has an enlarged diameter land 152. A frusto-conical element 153 is mounted on the land 152 so as to be free to slide and tilt very slightly on the land. The conical element 153 is rotatable with the shaft 119 and to effect this a key 154 extends through a slot in the extension 151 and engages a slot in the larger end face of the conical element 153. The end of the extension 151 passes through an aperture in a plate 164 mounted on the block 117, and a helical compression spring 155 (having flat ends, in known manner) is disposed between the plate 164 and an annular disc 156 which abuts the key 154. It will thus be seen that the conical element 153 is urged resiliently into engagement with the conical part 150 of the sleeve 149 by the spring 155. An operating lever 137 is secured to the end of the extension 151. The reservoir 130 for metal powder communicates via a passage 157 with a depression 158 in the conical element 153. The element 153 acts in a similar manner to the disc 141 in the arrangement of FIG. 8 so that the depression 158 receives a charge of metal powder while the depression 125 is delivering a charge of mercury, and when the shaft 119 is rotated through 180° the depression 158 delivers its charge of powder through the outlet passage 159 to the main outlet 128 while the depression 125 is receiving a further charge of mercury from the reservoir 120. As in the previous arrangement, since the conical element 153 is urged resiliently into engagement with the conical part 150 there is less tendency for metal powder to find it way between the interengaging surfaces of those parts, and should powder in time find its way between those surfaces the conical element 153 can yield against the action of the spring 155 so that the two surfaces do not bind.

It will be seen that the ends of the conical element 153 project beyond the ends of the land 152, and the central bore in the element 153 is chamfered as indicated at 160 and 161 so that any metal powder which should happen to find its way between the surfaces of the conical element and the part 150 will be carried clear of the land 152 so that it will not cause the element 153 to bind on the land. The end edges of the land 152 may also be chamfered. A slot 162 may be formed in the body 117 to receive any powder which finds its way between the surfaces and this slot may communicate with the exterior of the block. Also the larger diameter end of the conical element 153 is formed with an axially extending peripheral wall 163 which also carries any metal powder clear of the key 154.

It will be appreciated that other methods may be employed to key the conical element 153 onto the land 152. For example the land and element may be provided with co-operating splines or one or more keys may be received within corresponding axially extending slots in the land 152 and element 153. Such a key is in tight fitting engagement with the slot in one part and in looser engagement with the slot in the other part to permit axial movement and tilting of the element on the land. Alternatively a single axial spline integrally formed on the land 152 may be slidably received within an axial slot in the bore in the conical element 153. In these last mentioned arrangements the key 154 and the disc 156 will be omitted and the end of the spring 155 will bear directly on the end face of the element 153.

The conical element 153 and part 150 may be of any required cone angle. Also the spring 155 may be disposed between the conical element and an abutment on the extension 151 of the shaft instead of between the element and a fixed plate 164. For example the handle 137 might comprise the abutment. In a modified arrangement (not shown) the conical element is secured to or integral with the shaft and the shaft as a whole is biased by a spring to urge the conical part into engagement with the conical bearing surface. However the arrangement described above is preferred since due to the ability of the conical element to tilt it has self adjusting characteristics with respect to the conical bearing.

Figure 12:
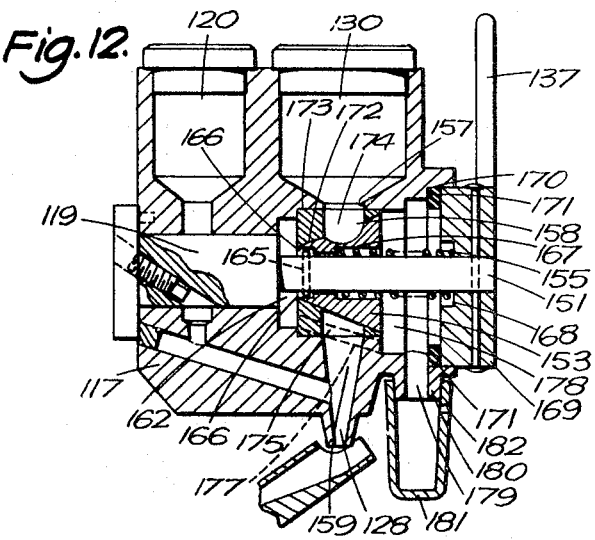
FIG. 12 is a similar view to FIG. 8 showing a further form of dispenser.

FIG. 12 shows a modified version of the dispenser shown in FIG. 11 and similar reference numerals refer to similar parts in the two figures.

In the arrangement of FIG. 12 the conical element 153 is keyed on to the reduced diameter portion 151 of the shaft 119 by means of a transverse pin 165 the ends of which project from the surface of the extension 151 at diametrically opposed points and are loosely engaged within diametrically opposed slots 166 in the central bore in the element 153. The ends of the pin 165 are so disposed in the slots 166 that the conical element is free to tilt and move axially to a certain extent on the shaft extension 151.

The dimensions of the bore in the conical element 153 are such that when its outer conical surface is in firm engagement with the conical bore in the elements 173 there is no contact between the conical element 153 and the shaft extension 151, and only the pin 165 is in contact with the conical element.

Part of the bore through the centre of the conical element 153 is enlarged in cross-section as indicated at 167 and the helical compression spring 155 encircling the shaft extension 151 is disposed between the end of the enlarged part of the bore and an annular recess 168 in a circular boss 169 which is secured to the end of the shaft extension 151 and carries the operating lever 137. The circular boss 169 is rotatable within an annular recess 170 in the end of the block 117 and this prevents axial movement of the shaft 119. A sealing ring 171 of hard rubber or similar material is located within the annular recess 170 to prevent leakage of metal powder past the boss 169.

Owing to the freedom of movement of the pin 165 in the slots 166 the conical element 153 is capable of a small degree of rotational movement on the extension 151 of the shaft. Because of this free movement the stop arrangement (described earlier with reference to FIG. 1) for limiting the rotation of the shaft to 180° is so arranged that the possible rotation of the shaft is slightly greater than 180° by the amount of free rotational movement of the conical element 153 on the shaft.

The helical compression spring 155 urges the conical element 153 into close fitting rotatable engagement with a cone shaped aperture 172 in a metal element 173 mounted within the block 117. The element 173 is formed in its upper part with a port 174 which is in communication with the passage 157 leading from the reservoir 130 for the metal powder. The element 173 is formed in its lower part with a port 175 which is in communication with the outlet passage 159 leading to the main outlet 128. The conical element operates to deliver metal powder from the reservoir 130 to the outlet 128 in a similar manner to the corresponding element in the arrangement of FIG. 11.

Preferably the elements 153 and 173 are formed from hardened steel since certain metal alloys used for amalgams are very abrasive.

Figure 13:
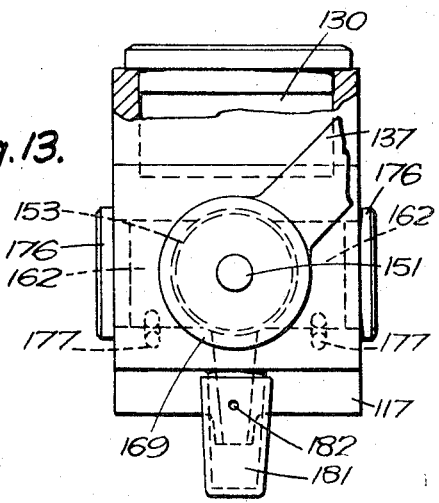
FIG. 13 is a view from the right of FIG. 12.

In the arrangement of FIG. 12 means are provided for collecting waste metal powder which finds its way between the interengaging surfaces of the conical element 153 and the element 173. As in the arrangement of FIG. 11, a transverse slot 162 is formed in the block 117 and this slot communicates with the exterior of the block. As shown in FIG. 13 the ends of the slot are closed by removable caps 176, for example formed from plastics, which are a push fit in the ends of the slot 162 to prevent spillage of metal powder from the slot during normal use of the apparatus. The caps 176 may be removed to clean out the slot from time to time. The slot 162 is in communication by means of two downwardly inclined passages 177 with a space 178 between the larger end face of the conical element 153 and the boss 169. Any metal powder which accumulates in the bottom of the slot 162 therefore eventually falls down the passages 177, assisted by the vibration of the apparatus, and passes into the space 178. Any metal powder which finds its way upwards along the interengaging faces between the elements 153 and 173 also finds its way directly into the space 178. A vertical passage 179 leads from the lower part of the space 178 and is encircled by a boss 180. A transparent collecting capsule 181 is a push fit on to the boss 180. The capsule 181 collects the waste metal powder and may conveniently be removed and emptied from time to time. An overflow hole 182 is provided in the wall of the capsule 181 to prevent the metal powder accumulating in the capsule 181 and the space 178 to such a level where it may foul the moving parts of the apparatus should the capsule 181 not be emptied.

The larger diameter end of the conical element 153 may be extended further towards the boss 169 so as to protect a greater length of the spring 155. In this case the part of the conical element which does not lie within the encircling element 173 may be formed with a peripheral groove so that any metal powder which finds its way to the larger diameter end of the conical element will be conducted down into the space 178 via the groove and will not pass beyond the end of the conical element and on to the unprotected part of the spring 155.

Figure 14:
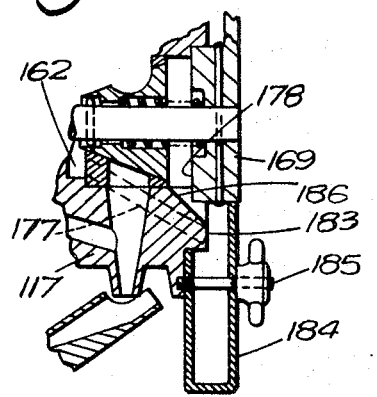
FIG. 14 is a section through part of a modified version of the dispenser of FIGS. 12 and 13.

FIG. 14 shows a slightly modified version of part of the dispenser shown in FIG. 13. In the arrangement of FIG. 14 the passages 177 do not pass from the slot 162 to the space 178 but lead to an opening in the end face 183 of the block 117. A transparent container 184 which is open at the top is detachably mounted on the block 117 by means of a screw and clamping nut 185, the open upper end of the container 184 being disposed to receive metal powder falling down along the passages 177. The edge of the block 117 between the end face 183 and the space 178 is chamfered as indicated at 186 so that metal powder finding its way into the space 178 can fall down the chamfer 186, passing beneath the boss 169, and into the container 184.

What is claimed is:

1. A method of forming an amalgam of mercury and metal powder comprising introducing metal powder into a chamber, the chamber being agitated whereby the metal powder forms a cloud within the chamber, and then introducing mercury into the chamber, while it is still agitating, in such a manner that the mercury is dispersed into a plurality of globules within the cloud of metal powder and combines with the metal powder to form an amalgam.

2. A mixing chamber having a feed conduit leading upwardly to it; means to oscillate the mixing chamber and feed conduit about an axis below the mixing chamber and transverse to the length of the feed conduit, whereby mercury and metal powder are delivered upwardly through the conduit to the mixing chamber by centrifugal force against the force of gravity; and an outlet disposed in the lower part of the mixing chamber through which outlet the formed amalgam falls when oscillation of the mixing chamber ceases.

3. Apparatus for forming an amalgam of mercury and metal powder comprising a feed conduit and mixing chamber forming part of a single unitary oscillatable structure, the axis of oscillation of which structure is inclined to the horizontal and is transverse to the length of the feed conduit, the mixing chamber being disposed above that axis, at least while being oscillated, whereby the mercury and metal powder are urged along the feed conduit towards the mixing chamber by centrifugal force, there being provided delivery means adapted to deliver the amalgam from the mixing chamber when its formation has been completed.

4. Apparatus according to claim 3 wherein the amplitude of oscillation of at least a part of the feed conduit is greater than the internal dimension of that part in the direction of oscillation.

5. Apparatus according to claim 3 wherein the delivery means comprise a conduit leading from an outlet disposed in the lower part of the mixing chamber, the inner surface of the walls of the chamber adjacent the outlet to the conduit being stepped to deflect transversely to the outlet material moving downwardly towards the outlet during agitation.

6. Apparatus according to claim 5 wherein the mixing chamber is oscillated along a curved path, the outlet to the delivery conduit being disposed on the inside of the curve whereby centrifugal force tends to urge material in the mixing chamber away from the outlet.

7. Apparatus according to claim 3 wherein the amplitude of oscillation of at least a part of the delivery conduit is greater than the internal dimension of that part in the direction of oscillation.

8. Apparatus according to claim 3 wherein the amplitude of oscillation of at least a part of the mixing chamber is less than the internal dimension of that part of the mixing chamber in the direction of oscillation.

9. Apparatus for forming an amalgam of mercury and metal powder comprising a mixing chamber, means for agitating the mixing chamber, feed means adapted to introduce the materials into the mixing chamber, delivery means adapted to deliver the amalgam from the mixing chamber when its formation has been completed, and a dispenser to supply to the feed means predetermined quantities of mercury and metal powder to be formed into an amalgam, which dispenser comprises a body part having a supply conduit leading from a reservoir for the metal powder to a first aperture in a face of the body part, and a delivery conduit leading from a second aperture in the face to a delivery outlet, and an element rotatably mounted on the body part and having a face which is in close, relatively rotatable engagement with the aforementioned face on the body part, the face on the element being formed with a depression which, in one rotational position of the element, is in register with the first aperture to receive a charge of powder from the reservoir, and in another rotational position of the element is in register with the second aperture to deliver the charge of powder through the outlet.

10. Apparatus according to claim 9 wherein said engaging faces are conical and are relatively movable towards and away from one another, resiliently yieldable means being adapted to urge the two faces into engagement.

11. Apparatus according to claim 9 and further comprising a shaft which is rotatable with the element and which is a close rotatable fit in a bore in the body part, a supply conduit leading to the bore from a reservoir for mercury, which conduit and reservoir are so arranged that the mercury is delivered under gravity to the bore, and a depression in the shaft which, in one rotational position of the shaft, is in register with the supply conduit so as to receive a charge of mercury, and in another rotational position of the shaft is in register with an outlet from the bore so as to deliver the charge of mercury through the outlet.

12. Apparatus according to claim 11 wherein the body part is formed with a slot which is in communication with the exterior of the block and which intersects transversely the bore in which said shaft is a close rotatable fit, the slot intersecting the bore at a location between said rotatable element and said depression in the shaft whereby mercury or metal powder leaking along the bore passes into the slot.

13. Apparatus according to claim 11 wherein said outlet from the bore and the aforementioned delivery outlet for the metal powder are in communication and lead to a single final outlet from the dispenser, and wherein the depressions, apertures, and outlets are so disposed that when the depression in the rotatable element is delivering a charge of metal powder through the delivery outlet, the depression in the rotatable shaft is receiving a charge of mercury, and vice versa.

References Cited

UNITED STATES PATENTS

| | | | |
|---|---|---|---|
| 2,541,043 | 2/1951 | Curry | 259—13 |
| 2,879,042 | 3/1959 | Jones | 259—2 |

ROBERT W. JENKINS, Primary Examiner

U.S. Cl. X.R.

259—75